United States Patent Office 3,143,934
Patented Aug. 11, 1964

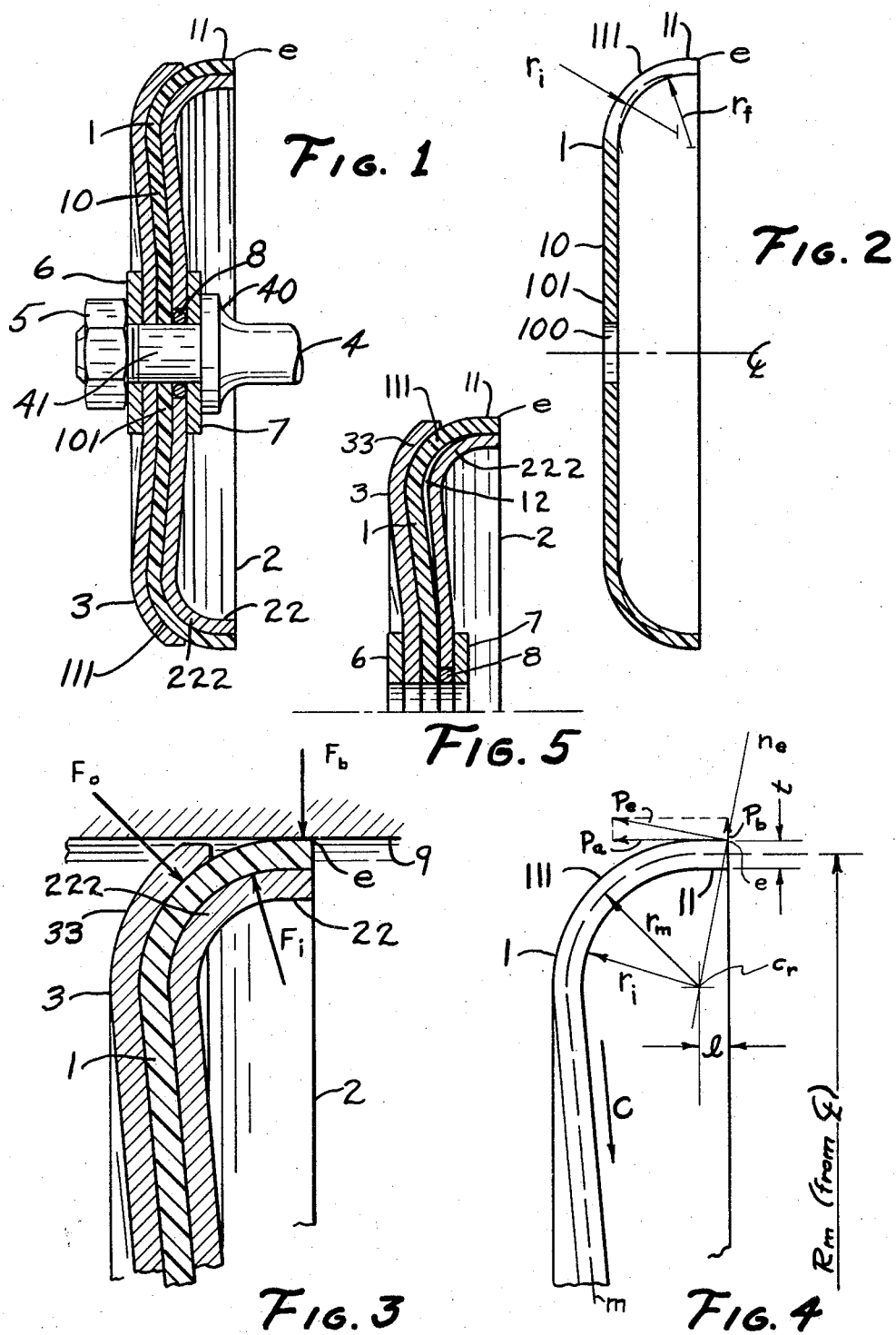

3,143,934
SEAL ASSEMBLY FOR A BORE
Robert E. Nelson, Rte. 1, Box 215, Willow Springs,
Rosamond, Calif.
Filed July 3, 1963, Ser. No. 292,539
6 Claims. (Cl. 92—250)

This invention relates to bore seals and has for an object to provide such a seal capable of maintaining effective sealing contact within a bore in spite of changes of ambient temperatures and conditions.

Bore seals are well known and are in common use. A problem which has been present in the use of seals of this character resides in the fact that there is often a difference in the coefficient of expansion of the bore material and of the seal material. Ordinarily the seal material has a much higher coefficient of expansion than the bore material so that as the ambient temperature and the equpiment with which the seal is associated becomes colder the seal materal tends to contract to a smaller diameter than the bore; and this tendency has often resulted in leakage past the seal.

Physical properties of the seal material are generally important in determining its suitability for the purpose although other factors are generally of consequence in the selection, such as chemical composition where the environment is of a chemical nature, solubility in fluids with which the seal may be used, and resistance to deterioration. Most of the materials suitable for use as a seal element have in common the problem of thermal expansion and contraction, which makes them difficult to control over widely varying temperatures. Typically, for example, Teflon has an average coefficient of expansion, or contraction, at temperatures between −30° F. and +30° F. of about 0.00005 per degree Fahrenheit, which is comparable to the expansion coefficient of other seal materials. Teflon, in addition, undergoes a transition increase in volume upon heating from 65° to 77° Fahrenheit, this volume increase being substantial, and as a practical matter, difficult to compensate due to the simultaneous occurrence of stress-related changes.

In general, the thermal change in linear dimension with temperature for most of the materials suitable for use as seal elements, may be several times as great as that for the metals generally used as material for a bore. When relatively high-contraction seal materials are used with relatively low-contraction bore materials at temperatures greatly reduced from their initial value, cup seals tend to shrink away from the bores, until, with contact force no longer present, actual separation and leakage-failure commence.

In accordance with the present invention, the bore seal arrangement is made with a geometry causing the tendency to contract to be automatically compensated such that the very contraction of the seal material causes the seal to deform in a manner ending to hold or move it outwardly against the bore.

The invention is carried out by the provision of a seal element in the form of a flexible cupped member of an elastomeric material held between a rigid cup or backing plate at the side of the seal away from the seal cup and a rigid inner cup or plate within the cup of the flexible seal. The arrangement is such that the flexible elastomeric seal member is compressed at its central portion between the inner and outer rigid plates.

At the outer annular portion of the flexible seal member, the seal member is not firmly clamped between the front and back plates; and it is at this region forming the rim of the seal member, that the seal member maintains its contact within the inner surface of the bore. The effective sealing function is carried out even when the temperature drops, because of the fact that the very contraction of the seal material tending to contract it inwardly from the bore, causes the seal material to contract in the radial direction toward the center; and this has the effect of rolling the curved cupped outer portion of the seal member, tending to straighten out the outer curved edge of the cup of the seal member so that even while contracting the curved outer edge is tending to move out against the bore and thus maintains the seal effective.

In the arrangement of this invention, the sealing cup is forced into loaded contact with the bore initially by interference between the cup as formed and the inside or front plate acting as the retaining element. This interference is forced by the outer plate or retaining element which initially drives the sealing cup over the inner retaining element. The initial loading or force of the bore against the seal is maintained even while the temperature reduces, by reason of added loading inherent in the structure, which partially or fully overcomes the otherwise paramount tendency of the cup to unload its bore-contact force by contraction of the material of the sealing edge.

The foregoing and other features of the invention will be better understood from the following detailed description and the accompanying drawings of which:

FIG. 1 is a view partly in cross-section of a bore sealing assembly in accordance with this invention;

FIG. 2 is a cross-section view showing the seal member of the assembly of FIG. 1, in its normal unclamped condition;

FIG. 3 is a detailed view in cross-section showing the outer portion of the sealing assembly within a bore being sealed;

FIG. 4 shows in cross-section geometric relationships of the seal member while held by its clamping plates; and FIG. 5 shows in half-section the sealing and cup elements of the unit shown in FIG. 1, but with the relative flare of the inner and outer elements exaggerated to show pictorially their preferred relationship.

Referring to the drawing, FIG. 1 shows a sealing assembly adapted to be fitted within a cylindrical bore, such as bore 9 (FIG. 3). The arrangement comprises a seal member 1 having a substantially flat back or web 10 with a centrally located hole 100 through its central portion 101. The outer portion 11 of the seal cup 1 is turned on a radius at 111 to form its cup shape, it being understood that the outer surface of the end portion 11 is cylindrical to fit within the cylindrical bore as shown in FIG. 3.

This assembly would normally have an extended edge sealing cup diameter greater than that of the bore, if it were not constrained by contact with the bore. As illustrated in the drawings, the assembly is shown as constrained to the normal diameter by the bore.

The seal member 1 is made of a flexible elastomeric material, preferably of tetrafluoroethylene resin polymer, known as "Teflon." If this particular polymer be not used, there should be used one of the rubber-like materials known as elastomers, as the more flexible and resilient of the plastic materials available are called.

The seal member 1 is placed between a rigid inside holding retainer plate or cup 2 and a rigid outside retainer plate or cup 3, which are preferably made of metal. These retaining cups 2 and 3 do not make contact with the bore. At the sides of retainer cups 2 and 3 remote from the seal member 1 there are provided washers 6 and 7. The members 2, 3, 6, and 7 are each provided with a central hole corresponding to the hole 100 of the seal member 1 so that the assembly can be mounted on a suitable bolt-like structure as shown in FIG. 1, which shows the formed end-segment 41 of a piston rod 4 which is provided with a shoulder 40 and a nut 5 threaded on the outer end to clamp the assembly firmly together.

An O-ring 8 makes sealing contact between the outer surface of the end segment 41, the inside of the center hole in the element 2 and a portion of the adjacent face of the sealing cup 1. According to common practice the piston is reciprocatable within the bore while the sealing arrangement maintains the seal.

Since sealing at the central bolt may be accomplished by means of the O-ring under nominal pressures, the assembly shown need not be especially tightly made. However, it is usually simpler to turn the nut 5 to clamping tightness, so that the central portion 101 of the sealing cup 1 may be regarded as firmly secured or clamped in place. Such tightness between the inner and outer rigid cups 2 and 3 should be avoided, however, over their outer areas remote from the washers 6 and 7, since as will appear hereinafter, it is desirable and even necessary that the sealing cup 1 be free to move radially over most of its surface between the retaining cups 2 and 3; and the cup should be tightly bound or secured only at or near its center.

In order to accomplish this freedom of radial movement of a large part of the material of seal 1 between its retaining plates or cups 2 and 3, while permitting clamping of the sealing cup at its center, cups 2 and 3 are preferably formed with a slight relative flair outwardly from the central or clamping area; that is, the distance between members 2 and 3 is made slightly greater, for example a few thousandths of an inch, near the region 111 than at the central portion where the nut 5 is drawn up to clamp the assembly. It is even possible to form cups 2 and 3 to have a uniform separation substantially equal to the thickness of the sealing cup 1, in which case use can be made of the existence of some degree of flexibility of the material of cups 2 and 3 to prevent the imposition of such an undue binding action on the seal member as to impair its ability freely to expand or contract radially between members 2 and 3. It is apparent that there should not be in any event any greater binding action of members 2 and 3 on the seal member near the outer periphery than at the central portion.

The relative flair between inner and outer cups is shown exaggerated for pictorial clarity in FIG. 5. Opposite the region in which the turning portion 111 of the seal 1 bears against the outer cup 3, the seal clears the inner cup 2 as shown at 12, substantially by the amount of relative flair between the cups 2 and 3.

In order that the desired degree of freedom of movement of the seal material be maintained, the retaining cups 2 and 3 are shown slightly dished in the direction opposite that of the extending region 11; that is, at their annular region near their peripheries their position is further to the left (with reference to FIG. 1) than at the washers 6 and 7. As appears in FIG. 1, the extent of this dishing is equal almost to the thickness of the washer 6. This results in forming out any initial irregularities in the sheet material from the cup blanks, and provides instead a controlled offset. When die formed, these parts become easy to maintain in uniformity.

The sealing cup 1 is initially formed separate from the members 2 and 3 in a shape as shown in FIG. 2 wherein some of the cross hatching to show the section is omitted at the cupped area in order that interference in assembly with the members 2 and 3 may be more clearly shown.

As initially made, the sealing cup 1 has its portion 10 lying in a plane which will be perpendicular to the bolt member 41 when assembled. Toward the outer periphery, the cup 1 curves away from the plane of portion 10 toward the outer edge of the seal member, this curve forming the toroid being around a sectional forming radius $r_f$. The curve 111 forming the toroid merges into a short cylindrical section 11 terminating at edge $e$, this cylindrical portion being adapted to engage the bore.

When this seal member 1 is incorporated into the assembly shown in FIG. 1, the material of the sealing cup 1 is forced into conformity with the outer sectional radius $r_i$ of the inside holding cup 2 as shown in FIG. 4 (wherein the cross hatching is omitted for the purpose of clarity). The broken lines in FIG. 2 indicate the curvature of the seal material as thus deformed according to radius $r_i$. The resulting loading effect on the seal member is as represented sectionally in FIG. 3, in which $F_o$ and $F_i$ represent loading forces, it being understood that the lengths of these arrows do not necessarily represent proportional loading effects. Rather, these arrows are intended to denote loads which may actually be somewhat distributed around the positions of the respective arrows.

If this motion were to be actually carried out, the edge $e$ would tend to move normal to the radial line $n_e$, that is, in the direction of arrow $P_e$. This potential motion has two components, one represented by the arrow $P_a$ in the direction along the bore, and the other $P_b$ outwardly in the direction normal to the surface of the bore. But, as installed and in contact with the bore 9, this attempted motion $P_b$ cannot occur because of the restraint offered by the cylindrical bore surface. Hence, this potential motion $P_b$ exists only as a stress distributed along the material of the seal member 1 as represented by the section of FIGS. 3 and 4. Thus, the magnitudes of the stresses represented by the load arrows $F_b$, $F_i$, and $F_o$, tend to increase with contraction of the material. At the same time, the material of the extended cylindrical portion 11 is experiencing a tendency to contract; and if this contracting tendency were not realized as actual movement, would create a stress opposing that caused by the turning of the cup around the center $c_f$ as represented by the cross-section.

As a result of the foregoing relationships, the material of seal member 1 contracts when it gets colder and expands when it gets warmer at a faster rate than the material of the retaining cups 2 and 3, as the latter are ordinarily of metal. Thus, when the seal material contracts, it creeps inwardly toward the central hole 100, between the members 2 and 3; and the portions 111 and 11 creep or roll around the rigid curvature of the cup part of retaining member 2, producing the tendency of the edge $e$ to flair out toward the bore surface to maintain good contact.

It has been found possible to make the compensation so effective that the bore force $F_b$ remains unaltered as contraction of the seal material proceeds with reducing temperature; and conversely, the opposite process, causing $F_b$ to remain unaltered, goes on as the temperature increases. It has been found that with the principal dimension related and defined as in FIG. 4, the permissible length $l$ of the cylindrical cup extension 11 past the position $c_r$, varies approximately as the square root of $R_m$ or of the material thickness $t$ when each is varied independently of the other.

It will be recognized that by my invention I have provided an elastomeric cup-shaped seal adapted to maintain its sealing force against the wall of a bore over a wide range of temperature.

The particular embodiment shown in the drawing and specification is given by way of illustration rather than of limitation; and the invention is not limited except in accordance with the scope of the appended claims.

What is claimed is:

1. A seal assembly for sealing a bore, comprising a cup-type seal member of flexible elastomeric material having a higher temperature coefficient of expansion than that of the bore, an inner retaining cup on the cup side of the seal member, an outer retaining cup on the opposite side of the seal member, said seal member being bound tightly between the retaining cups at the region near the center of the seal member and being bound less tightly at outer regions of the seal member so that the material of the seal member can creep between the retaining cups when undergoing a temperature change, said inner retaining cup having a toroidal curvature at its outer periphery with a different radius of curvature from the radius of curvature of the cup of the seal member, the seal member being urged by the outer retaining cup against the inner retaining cup and thus deformed to conform to the curvature of the inner retaining cup, whereby the edge of the seal member tends to maintain firm contact with the bore even when the temperature drops.

2. A seal assembly according to claim 1 in which a length of the cup of the seal member adjacent its outer edge is cylindrical for a distance when the assembly is within the bore.

3. A seal assembly according to claim 2 in which said cylindrical length is approximately equal to the distance from the plane of the edge of the seal member to the center of the radius of curvature of the cup of the inner retaining cup.

4. A seal assembly according to claim 1 in which the inner retaining cup and outer retaining cup are dished in the direction opposite that in which the edge of the seal cup extends, thereby deforming the seal member at its position between the retaining cups to conform to the dished shape.

5. A seal assembly according to claim 1 in which the material of the seal member is tetrafluoroethylene.

6. A seal assembly for sealing a bore, comprising a cup-type seal member of flexible elastomeric material having a higher temperature coefficient of expansion than that of the bore, an inner retaining cup on the cup side of the seal member, an outer retaining cup on the opposite side of the seal member, said seal member being bound between the retaining cups at the region near the center of the seal member and having a natural set in the curvature of its cup, the curvature of said inner retaining cup having a different radius of curvature than the natural curvature of the sealing cup, the seal member being urged by the outer retaining cup against the inner retaining cup and thus deformed from its natural curvature to conform to the curvature of the inner retaining cup whereby the edge of the seal member tends to maintain firm contact with the bore over a wide temperature range.

References Cited in the file of this patent

UNITED STATES PATENTS

| | | |
|---|---|---|
| 1,362,838 | Brandt | Dec. 21, 1920 |
| 1,386,333 | Hill | Aug. 2, 1921 |
| 2,836,474 | Mosher | May 27, 1958 |
| 2,911,270 | White | Nov. 3, 1959 |